J. D. PURCELL.
NUT LOCK.
APPLICATION FILED NOV. 30, 1914.
1,245,966.
Patented Nov. 6, 1917.
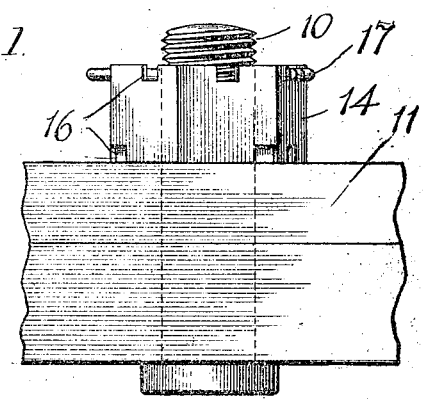
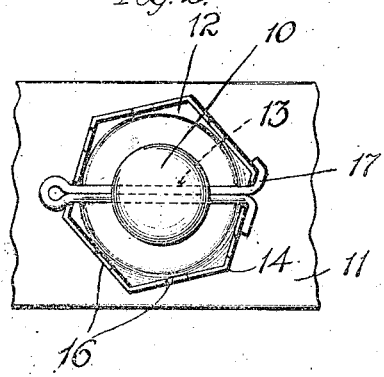
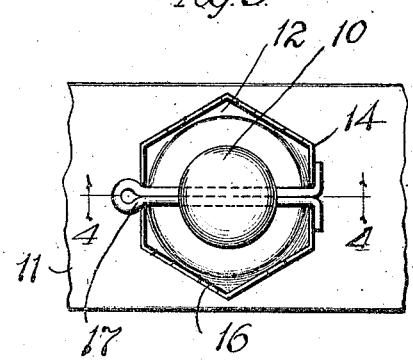
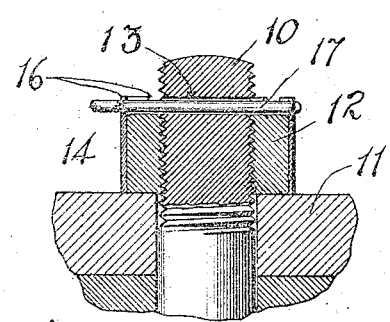
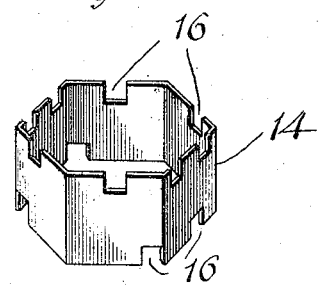
Witnesses:
Robert H. Weir
Inventor
Joseph D. Purcell

UNITED STATES PATENT OFFICE.

JOSEPH D. PURCELL, OF OAK PARK, ILLINOIS.

NUT-LOCK.

1,245,966.

Specification of Letters Patent.

Patented Nov. 6, 1917.

Application filed November 30, 1914. Serial No. 874,616.

*To all whom it may concern:*

Be it known that I, JOSEPH D. PURCELL, a citizen of the United States, residing at Oak Park, in the county of Cook and State of Illinois, have invented certain new and useful Improvements in Nut-Locks, of which the following is a specification.

My invention relates to improvements in nut locks, and has for its general object to provide a simple, inexpensive and efficient means by which the nut, of any usual polygonal form as square or hexagonal, may be locked against rotation relative to a pierced bolt. A further object of my invention is to provide a locking structure which will accommodate itself to any angular relation that may happen to exist between the corners of the nut and the hole of the pierced bolt, when the nut is screwed home.

Other and further objects of my invention will be apparent to those skilled in the art from the following description taken in conjunction with the accompanying drawing, wherein Figure 1 is a side elevation of a structure embodying my invention;

Fig. 2 is a plan view thereof with the nut in one relation to the pierced bolt;

Fig. 3 is a similar view with the nut in another relation to the bolt;

Fig. 4 is a cross section on line 4—4 of Fig 3; and

Fig. 5 is a perspective detail of the locking band detached.

The bolt 10 that is shown as extending through a body 11, typifying any body against which a nut 12 is to be screwed home, and the nut 12 is shown as a conventional hexagonal nut, typifying any desired polygonal form. The bolt is pierced by a diametrical hole 13 near its free threaded extremity at a point that will be slightly beyond the nut, in use. 14 indicates a locking band, preferably drawn from sheet metal, so as to be without seam or joint, shaped in plan to interfit reasonably snugly with the perimeter of the nut and in depth somewhat greater than the depth of the nut, so that when the bottom of said band, encompassing the nut, rests upon the surface of the body 11, its upper edge projects beyond the pierced portion of the bolt. This band, will, of course, prevent rotation of the nut with respect to the bolt if the band is anchored to the bolt itself. Notches 16, forming diametrically opposed pairs, are made in one or both of the edges of the band, there being preferably notches made in each of the faces of the band and, preferably, no two pairs of notches being identical in their relation to their respective similar faces of the band. Preferably not more than one or two notches are made in the same edge of any one face of the band, and where more than one notch is made in any face the plural notches therein are relatively widely separated, so that between adjoining notches there will be a relatively large body of material adequate for strength to resist torque. Also, preferably, the side edges of each notch are made axial or vertical, so that each side edge presents a square abutting surface. 17 indicates a cotter pin, as a convenient form of fastening device, passing through a pair of diametrically opposed slots in the band and through the opening 13, thereby rigidly to lock the band, and therefore the nut, against rotation, relative to the bolt.

In using the structure the nut may be screwed up tight upon the bolt, and of course, even where the nut, bolt, and bolted body are supposed to be uniform, the nut when screwed tight is apt to stand in different relations to the hole 13 in different specific instances. The non-symmetrical notches provided in different faces of the band will accommodate these differences of adjustment, for, whatever the position of the nut may be with respect to the opening 13, the turning of the band to bring a properly selected face opposite to the hole 13, before said band is applied to the nut, will locate some one pair of notches 16 in so close an approximation to perfect alinement with the hole 13 that the cotter pin may be inserted without difficulty.

It will be apparent that ordinary nuts may, through the practice of my invention, be employed where castellated nuts are now ordinarily used, but with decreased expense and increased facility as compared with such castellated nuts.

While I have herein described in some detail a specific embodiment of my invention it will be apparent that changes in construction might be made without departure from the spirit of my invention and within the scope of the appended claims.

Having described my invention, what I claim is:

1. The combination with a bolt having a perforated threaded end; of an abutment having an opening through which the threaded end of the bolt projects; a nut screwed on the threaded end of the bolt with its inner end in engagement with the abutment; an endless band surrounding the sides of the nut, the inclosed opening within the band conforming to the plan outline of the nut, said band intermediate its end portions being imperforate with its sides lying wholly in planes parallel with the adjacent sides of the nut with which they contact, and parallel with the axis of the nut, the inner end of the band contacting with the abutment and its outer edge portion having edge-opening notches lying outside the end of the nut; and a pin projecting through the perforation in the bolt into one of the notches.

2. The combination with a bolt having a perforated threaded end; of an abutment having an opening through which the threaded end of the bolt projects; a nut screwed on the threaded end of the bolt with its inner end in engagement with the abutment; an endless band surrounding the sides of the nut, the inclosed opening within the band conforming to the plan outline of the nut, said band intermediate its end portions being imperforate with its sides lying wholly in planes parallel with the adjacent sides of the nut with which they contact, and parallel with the axis of the nut, the inner end of the band contacting with the abutment, said band having notches in one edge portion open to the edge, the notches in diametrically opposite faces alining in pairs, and the several pairs of notches being arranged in different relation to the sides of their respective faces, said notches having axially extending straight sides; the opposite edge portion of the band being provided with similarly disposed notches positioned to lie in axial alinement with the unnotched portions of the opposite edge; and a pin projecting through the perforation in the bolt into one of the notches.

In testimony whereof I hereunto set my hand in the presence of two subscribing witnesses.

JOSEPH D. PURCELL.

In the presence of—
J. A. MARPEAU,
PAUL H. PAYNE.

Copies of this patent may be obtained for five cents each, by addressing the "Commissioner of Patents. Washington, D. C."